(12) United States Patent
Farahati et al.

(10) Patent No.: US 8,276,720 B2
(45) Date of Patent: Oct. 2, 2012

(54) DOUBLE PATH TORSIONAL DAMPER

(75) Inventors: Rashid Farahati, Copley, OH (US); Michael G. Swank, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 407 days.

(21) Appl. No.: 12/579,689

(22) Filed: Oct. 15, 2009

(65) Prior Publication Data

US 2010/0096788 A1    Apr. 22, 2010

Related U.S. Application Data

(60) Provisional application No. 61/196,541, filed on Oct. 17, 2008.

(51) Int. Cl.
*F16D 57/02* (2006.01)

(52) U.S. Cl. .......... 188/291; 192/213; 464/68.1

(58) Field of Classification Search .......... 188/291, 188/290; 192/213–213.31; 464/68.1, 67.1
See application file for complete search history.

(56) References Cited

U.S. PATENT DOCUMENTS

| | | | |
|---|---|---|---|
| 4,809,830 A * | 3/1989 | Schierling et al. | 192/3.29 |
| 4,844,216 A | 7/1989 | Fukushima | |
| 5,713,442 A | 2/1998 | Murata et al. | |
| 5,980,387 A | 11/1999 | Friedmann et al. | |
| 6,029,793 A * | 2/2000 | Tanaka et al. | 192/213 |
| 7,658,679 B2 * | 2/2010 | Avins et al. | 464/68.1 |
| 2004/0185940 A1* | 9/2004 | Yamamoto et al. | 464/68 |
| 2009/0125202 A1 | 5/2009 | Swank et al. | |

FOREIGN PATENT DOCUMENTS

| | | |
|---|---|---|
| DE | 3636014 | 4/1988 |
| DE | 3823384 | 1/1990 |
| DE | 19839528 | 3/2000 |
| EP | 0308178 | 12/1992 |
| GB | 2299147 | 9/1996 |

* cited by examiner

Primary Examiner — Pamela Rodriguez
(74) Attorney, Agent, or Firm — Simpson & Simpson, PLLC

(57) ABSTRACT

The present invention is a double path torsion isolator for use in conjunction with a torque converter. Each of the two vibration paths includes a flange with a spring connection to each of the torque converter cover and an output connection attached to the transmission shaft. The torque converter turbine is connected to one of the flanges to provide a different frequency to the associated vibration path. When the lockup clutch is engaged, the engine vibration is divided along the two vibration paths toward the common output connection. The vibration frequency of the paths are adjusted so that the frequencies of the two paths are 180° out of phase at the output connection providing a vibration cancellation effect to the output connection.

27 Claims, 7 Drawing Sheets

DOUBLE PATH TORSIONAL DAMPER

CROSS-REFERENCE TO RELATED APPLICATIONS

This application claims the benefit under 35 U.S.C. §119(e) of U.S. Provisional Application No. 61/196,541 filed Oct. 17, 2008 which application is incorporated herein by reference.

FIELD OF THE INVENTION

The present invention relates to the field of vehicle drive trains. More specifically, the invention relates to reduction of the conduction of engine vibration to the vehicle transmission and more particularly to the dampening of engine vibration through the torque converter.

BACKGROUND OF THE INVENTION

Clutches are used to provide a mechanical by-pass for the hydrodynamic coupling in torque converters in order to improve fuel economy in vehicles. The clutch is engaged and stays locked as soon as torque multiplication is no longer required. During clutch engagement, the engine vibration will be transferred via the clutch to the drivetrain which causes excess wear on components of the drivetrain as well as passenger discomfort. To reduce the transmitted torsional vibrations, torsional isolators or dampers are placed in clutches between the engine output torque and the transmission input shaft. Torsional dampers typically comprise an arrangement of springs and friction plates serving as an elastic member to reduce the engine vibration amplitude. To isolate today's engine with more and more power, many complex spring arrangements are being designed. However, they all can introduce extra undesirable resonant frequencies that cause or increase unwanted vibrations.

The problem of undesirable resonant frequencies is often addressed by using a plurality of series torsional isolators in torque converters. This trend is also driven by the push for improved fuel consumption and reduced lugging limits. To maintain or improve torsional isolation, lower spring rates are required. Cylinder shutoff applications and a general trend toward a decreased number of engine cylinders further enforce the need for lower spring rate (increased isolator spring volume). Due to envelope constraints, the most efficient way to increase spring volume is to connect two concentric rows of springs together in series (hence the so called series isolator). This arrangement provides the maximum spring volume for the typical envelope available for the torsional damper.

This arrangement requires the use of one or more plates to serve as a torsional connection between the outer and inner row of springs (the so called "floating flange"). Unfortunately, the inertia of floating flange(s) is substantial for any concentric spring series arrangement. This inertia introduces an addition degree of freedom to the torsional drivetrain system that causes an objectionable vibration in the vehicle. One method of overcoming the additional degree of freedom is to introduce a friction package across one of the concentric spring packages to absorb the energy of the flange mode. However, this approach has the distinct disadvantage of degrading the isolation the damper provides at all frequencies other than the flange mode.

Thus, a problem exists in the field concerning the reduction of vibration produced in the engine that is transmitted through the drive train when a torque converter clutch is engaged with the vehicle engine.

SUMMARY OF THE INVENTION

The present invention broadly comprises a double path torsional vibration damper for a torque converter having a lockup clutch, the isolator comprising a first flange and a second flange, with the first flange attached to the turbine of the torque converter, a first pair of springs, the first one of the first pair of springs extending between an outer hub of the torque converter and the first flange and the second one of the first pair of springs extending from the first flange to an output connection, the output connection operatively connected to a transmission input drive. The invention also comprises a second pair of springs, with the first one of the second pair of springs extending between the outer hub and the second flange and the second one of the second pair of springs extending from the second flange to the output connection. The first pair of springs forms a first vibration path including the outer hub, the first pair of springs, the first flange and the output connection and the second pair of springs forms a second vibration path including the outer hub, the second pair of springs, the second flange and the output connection. In a preferred embodiment, the spring rate of the first pair of springs is less than or equal to the spring rate of the second pair of springs. In a more preferred embodiment, the spring rate of each of the vibration paths is tunable (adjustable). In some embodiments, the outer hub may be the torque converter cover.

One object of the invention is to provide a device for reducing the transmission of engine vibration when a torque converter clutch is engaged.

A second object of the invention is to supply a device that divides the vibration path between the engine and the transmission.

A third object of the invention is to provide a vibration reducing device that is adjustable for various sized drive train components.

A fourth object of the invention is to provide a vibration reducing device in which two vibration paths are adjustable so that the frequency of one path is 180 degrees out of phase with the other path when the vibration waves reach the ends of the paths.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF PREFERRED EMBODIMENTS OF THE INVENTION

At the outset, it should be appreciated that like drawing numbers on different drawing views identify identical structural elements of the invention. It also should be appreciated that figure orientations, proportions, and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Figure 1:
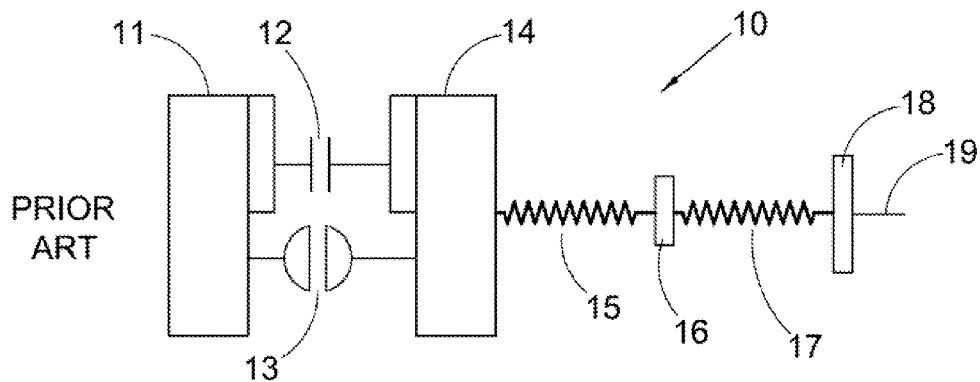
FIG. 1 is a schematic view of a single path torsional vibration damper.

Adverting to the drawings, FIG. 1 is a schematic view of a single path torsional vibration damper 10, typical of the prior art. Engine 11 is operatively connected to turbine 14 through clutch 12 and fluid coupling 13. By operatively connected is meant that a component or device is connected either directly or indirectly to a second component and causes that second component to function. For example, clutch 12 and fluid coupling 13 separately operatively connect engine 11 to turbine 14 as both act to transmit the movement of the engine (or engine crankshaft) to turbine 14. The assembly of outer spring 15, floating flange 16, and inner spring 17, is connected to isolator hub 18 which acts as an output connection to transmission input shaft 19. It will be recognized that outer spring 15 and inner spring 17 may be reversed and that flanges in the various embodiments of the dampers discussed infra, are one form of inertial elements that may form vibration pathways.

Figure 2:
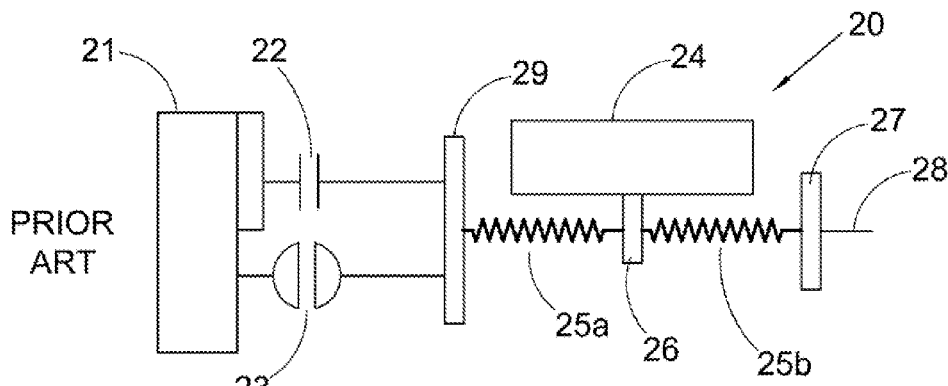
FIG. 2 is a schematic view of a single path vibration damper in which a single flange is attached to a torque converter turbine.

FIG. 2 is a schematic view of a series double damper 20 found in the prior art in which a single flange 26 is attached to turbine 24. Engine 21 is attached to hub 29 through clutch 22 and fluid coupling 23. Flange 26 is connected to turbine 24. Outer spring 25a and inner spring 25b connect flange 26 to hub 29 and isolator hub 27. Similar to the embodiment seen in FIG. 1, isolator hub 27 acts as an output connection to transmission input shaft 28.

Figure 3:
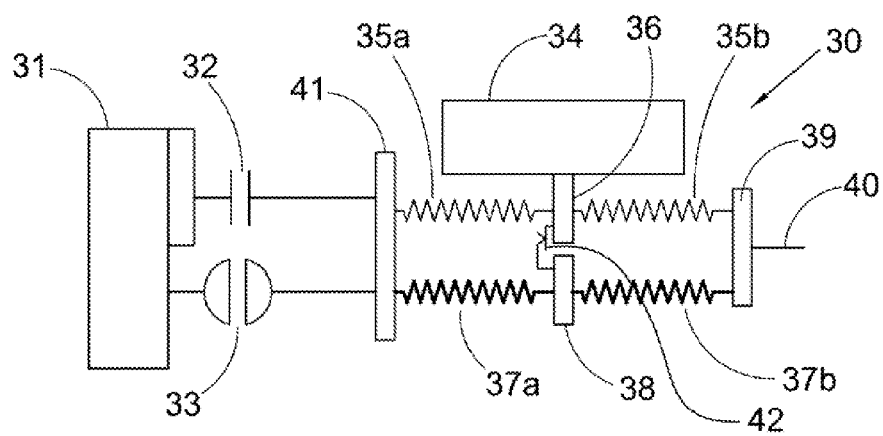
FIG. 3 is a schematic of the double path torsional damper of the present invention.

FIG. 3 is a schematic of the double path torsional damper 30 of the present invention. Engine 31 is operatively attached to outer hub 41 through clutch 32 and fluid coupling 33. It is well known that fluid coupling 33 of damper 30 transmits rotational motion from engine 31 through the pump (not shown) and turbine 34 of the associated torque converter, while clutch 32 transmits this rotational motion when engaged with engine 31. Engine vibration will also be transmitted though clutch 32. Clutch 32 is operatively connected to outer hub 41.

Flange 36 is attached to turbine 34. A pair of springs 35a and 35b attach flange 36 to outer hub 41 and isolator hub 39, respectively. Together springs 35a, 35b, and flange 36 form a first vibration path connecting outer hub 41 and isolator hub 39. A second pair of springs 37a and 37b attach flange 38 to outer hub 41 and isolator hub 39 respectively. Together springs 37a, 37b, and flange 38 form a second vibration path connecting outer hub 41 and isolator hub 39. In a preferred embodiment, the first vibration path and the second vibration path are substantially parallel. It should be noted that both the first and second vibration paths begin on the outer hub 41 and terminate on isolator hub 39.

Figure 5A:
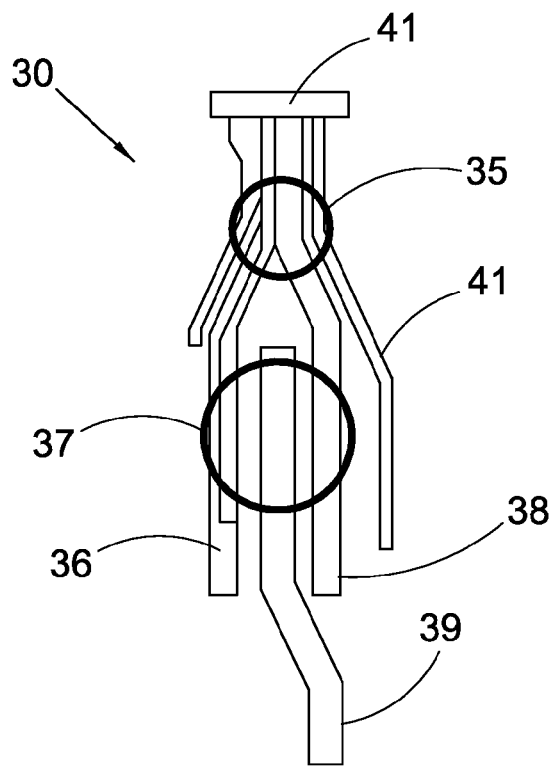
FIG. 5A is a cross section view of the double path damper of the present invention showing the structural relation of its component parts.
Figure 5B:
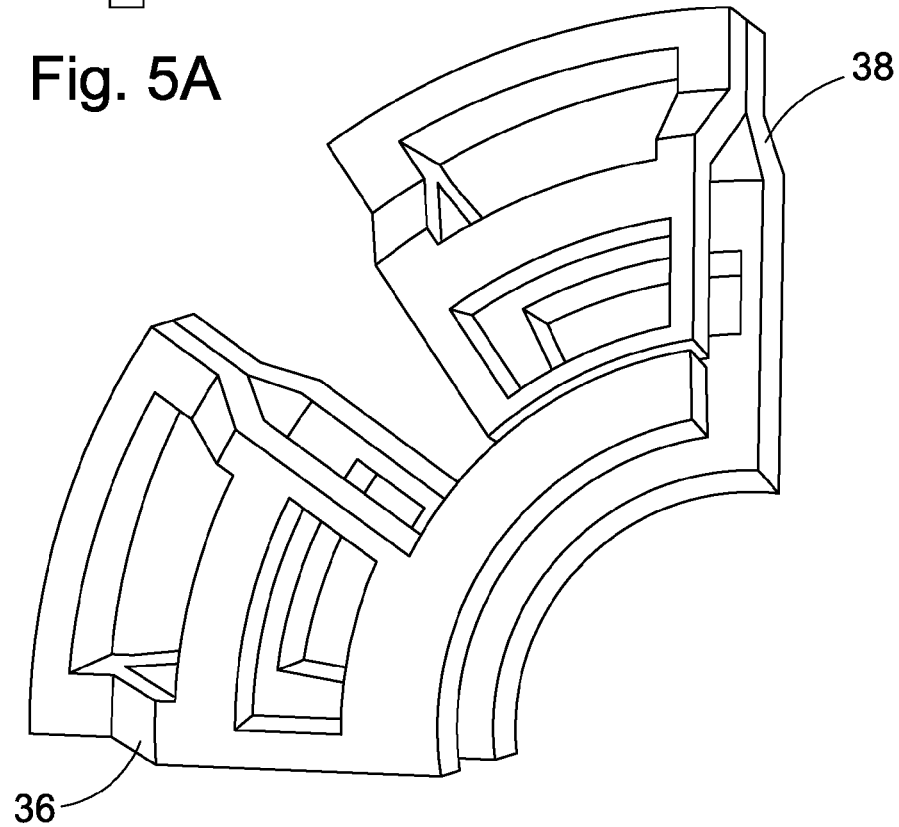
FIG. 5B is a side perspective of the two flanges of the double path damper of the present invention.

FIG. 5A is a cross section view of double path damper 30 showing the structural relation of outer hub 41, flanges 36 and 38, springs 35 and 37, and output connection 39. FIG. 5B is a side perspective view of one possible structure of flanges 36 and 38.

Figure 9:
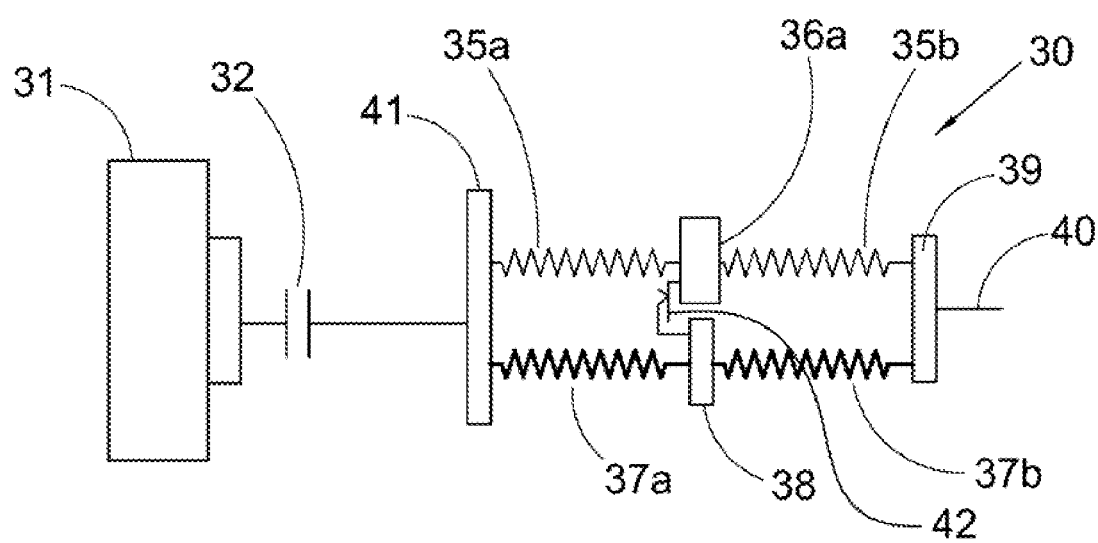

FIG. 9 is a schematic view of double path damper 30 adapted for use without attaching a torque converter turbine to a flange in one of the vibration pathways. Clutch 32 provides the operative connection of damper 30 to engine 31. In contrast to the embodiment seen in FIG. 3, the natural frequency of the upper pathway is made lower than that of the lower pathway by adding mass to flange 36a rather than attachment to a torque converter turbine. Such an embodiment may be used with drivetrains with manual transmissions which do not normally utilize a torque converter. In addition, in this embodiment, first hub 41 and second hub 39 may be used to flank or surround the springs and flanges of damper 30.

Operation of the Double Path Torsional Damper

Figure 4:
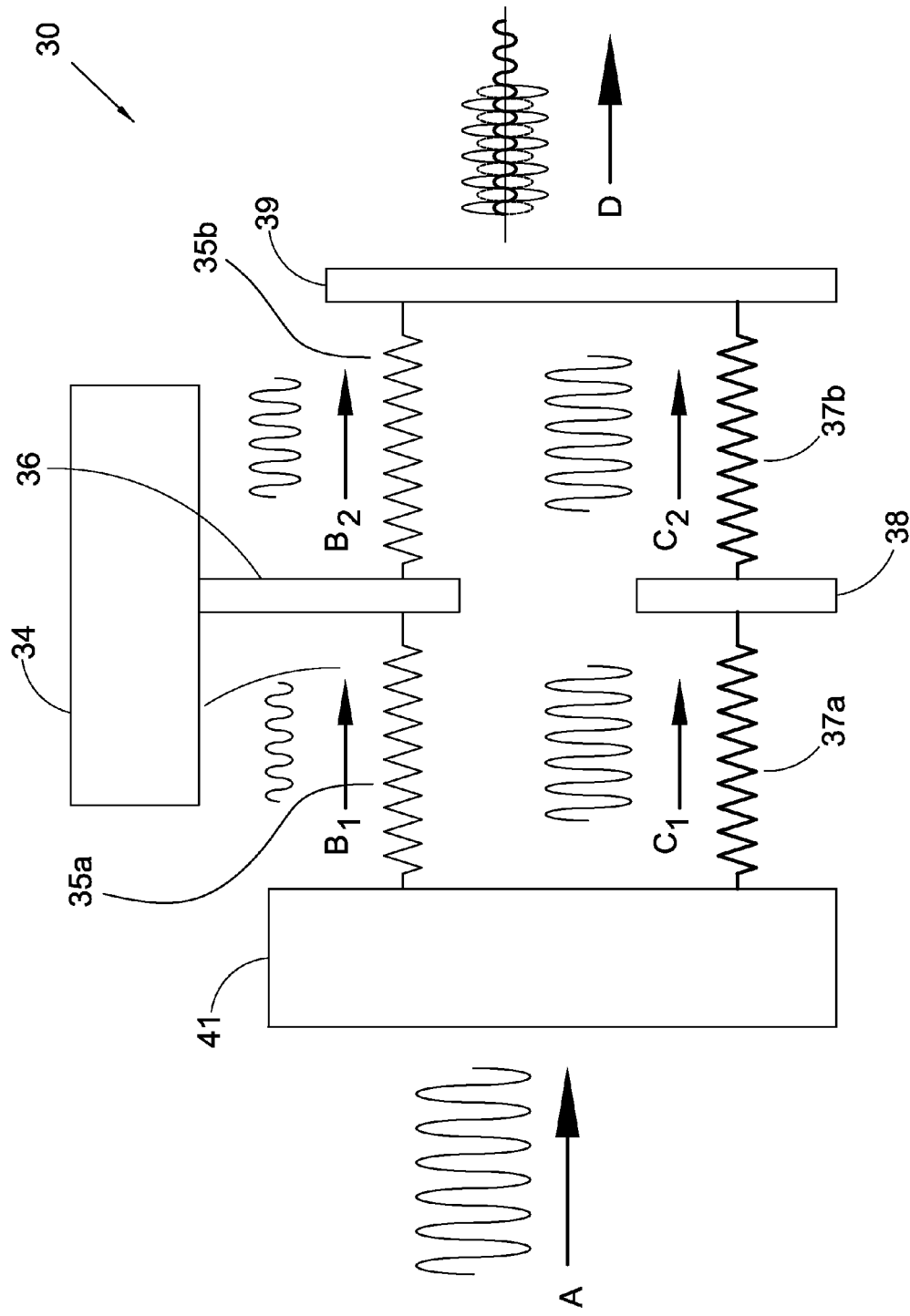
FIG. 4 is a schematic drawing of the double path damper showing changes in the amplitude in vibration along the vibration paths.

FIG. 4 is a schematic drawing of the double path damper 30 of the present invention. Vibration path A extends from the engine and clutch (not shown in FIG. 4) to output hub 41. Vibration path A is divided into two parallel vibration paths B and C respectively including the two separate intermediate flanges 36 and 38, respectively. Additional mass, for example the mass of turbine 34, is attached to flange 36 to lower the natural frequency of that flange. Additional mass may be added by increasing the size of inertial element or flange 36 of pathway A. This creates two separate natural frequencies for each vibration pathway B and C rather than one single frequency. These two separate natural frequencies can be selected or "customized" for a specific drivetrain by determining the spring rate distribution between paths B and C as well as adjusting the inertia of the flanges individually based on the specific elastic elements and inertial elements used to form the vibration pathways. Examples of elastic elements include rubber slugs, compression springs, and ball ramps combine with diaphragm springs. The original single vibration A from the engine enters into the two parallel vibration paths B and C each with the same wave phases but different amplitudes. During engine speed ramp up or acceleration, when the engine_vibration A having a frequency ($\omega$) reaches to the path B (turbine+flange) having a natural frequency ($\omega_{nt}$), only the vibration phase in turbine+flange path $B_2$ will be shifted 180° opposite of the original wave. The natural frequency of the second flange (path C) is much higher than for path A. Therefore, the vibration wave continues to pass along vibration path C without any shift in the phase. Because the frequencies of paths B and C can be determined based on the specific components chosen for a particular vibration path, they can be adjusted so that the two vibration waves $B_2$ and C reach output hub 39 180° out of phase with each other, producing a vibration cancellation or reduction effect. In other words when the turbine+flange path $B_2$ starts to resonate 180° out of phase with the original path C, it serves somewhat like a mass absorber. This results in an output vibration D having a much lower amplitude.

Figure 8:
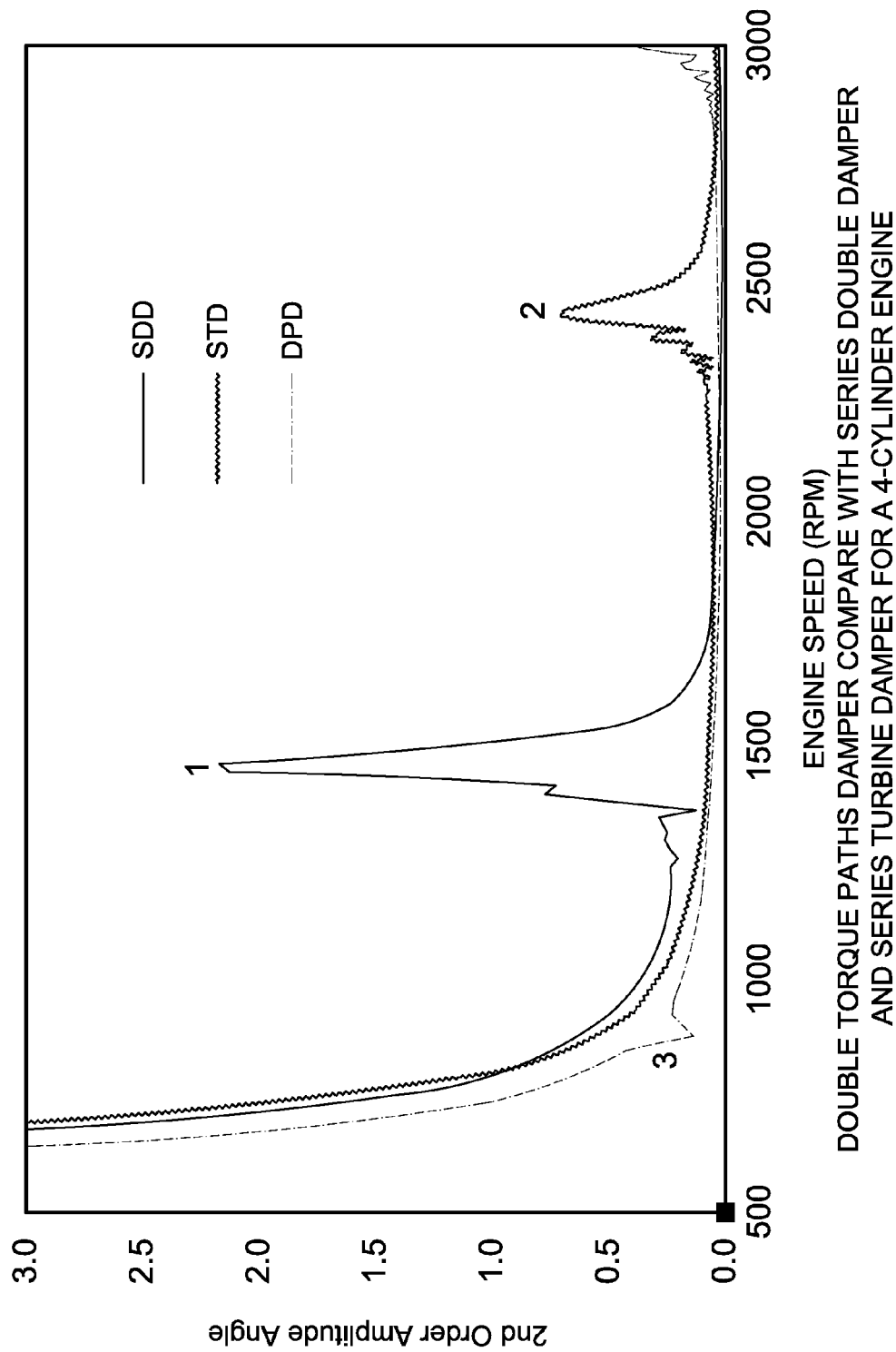
FIG. 8 is a graph comparing the damper effects of the double path damper of the present invention with prior art dampers; and, FIG. 9 is a schematic view of an alternate embodiment of the double path damper of the present invention.

The inertia of a floating flange in a series torsional isolator is substantial for any concentric spring series arrangement as seen in FIG. 1. This inertia introduces an additional degree of freedom to the torsional drivetrain system (flange mode). Since the spring rate and the flange inertia are dictated by the design requirement of the flange—spring assembly, the natural frequency of the flange itself cannot be adjusted. The construction of a double path damper 30 with two parallel vibration paths B and C with two separate series spring arrangements 35 and 37, respectively, provides two individual flanges 36 and 38 with two natural frequencies instead of one. The effective spring rate (K) in a parallel configuration is $K=K_1+K_2$, so by variably distributing the spring rate between these two paths one path can become softer as the other path becomes stiffer. The flange with softer spring rate (flange 36) will have a lower natural frequency while flange 38 with stiffer spring rate would have a higher natural frequency than the natural frequency from an isolator having one vibration path. In addition, if more inertia is added to flange 36, the natural frequency of flange 36 will decrease further. Since the turbine in a torque converter has no acceleration or ramp-up function when the clutch is locked to the engine, the inertia of the turbine 34 can be added to the inertia of flange 36 when it is attached to it, which further lowers the natural frequency of flange 36. (See FIGS. 3 and 4 for a schematic construction of the attached turbine.) FIG. 8 displays a graph of the comparison between a prior art Series Turbine Damper (STD 10) (see in FIG. 1), a prior art Series Double Damper (SDD 20) (see in FIG. 2), and the Double Path Damper (DPD 30) with variant distribution spring rate of the present invention (see in FIG. 3).

EXAMPLE

Figure 6:
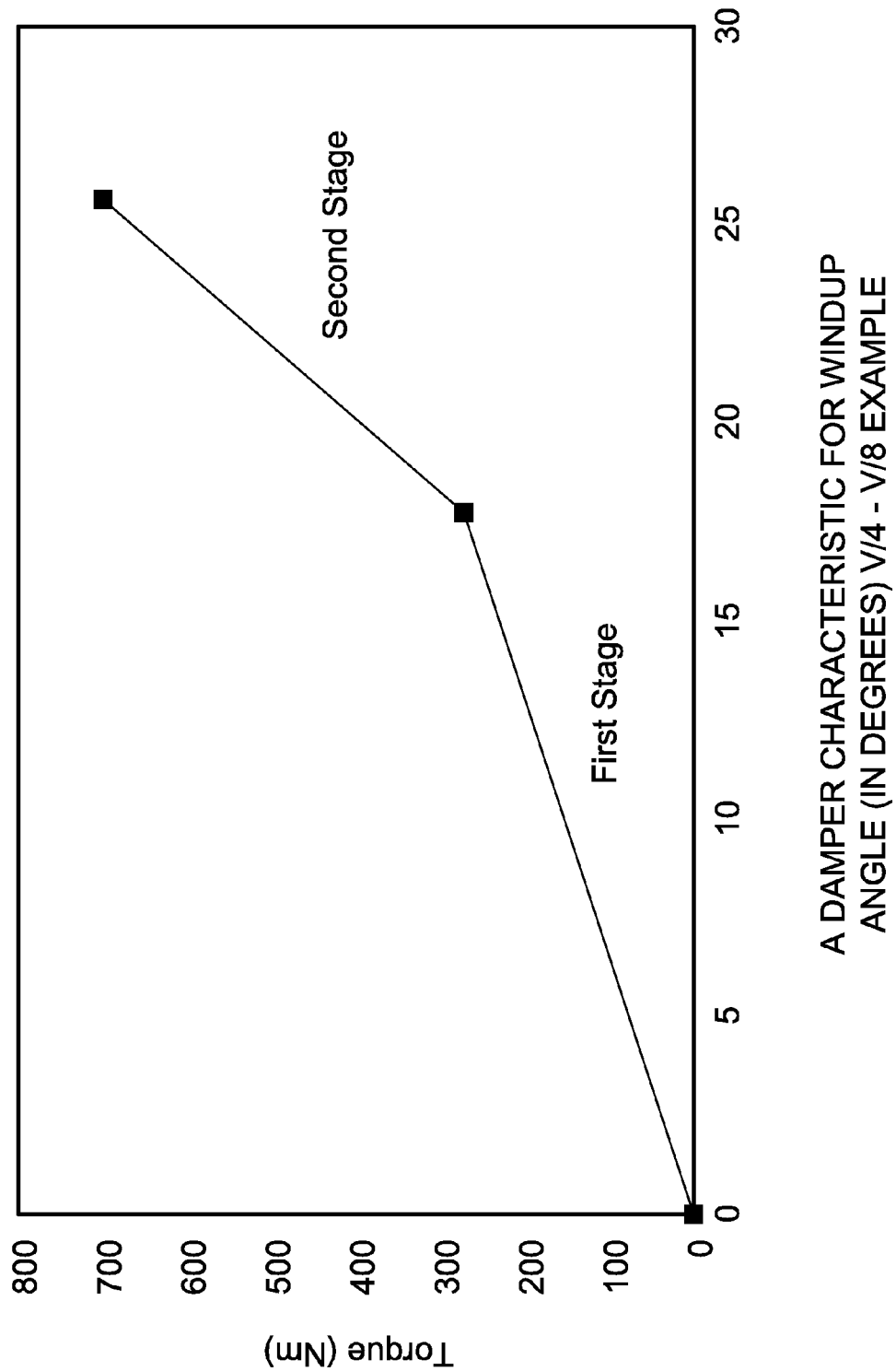
FIG. 6 graphically portrays the damper characteristic for the V/4-V/8 engine.

For an engine with a deactivation system (V4-V8—four cylinders are shut down when idling) a series damper with characteristic like FIG. 6 is needed. FIG. 6 graphically portrays the damper characteristic for the V/4-V/8 engine. During the V4 mode, the engine is running in the first stage and during the V8 mode the engine runs in the second stage. For a conventional series damper (FIG. 1) we need a spring rate of 18.25 Nm/° for the first stage and 53.69 Nm/° for the second stage. The only results shown are for the V4 mode, which is the worst case, in which Turbine Inertia=0.03 kgm2/rad, Floating flange Inertia=0.0135 kgm2/rad, and Isolator Hub Inertia=0.002 kgm2/rad.

Figure 7:
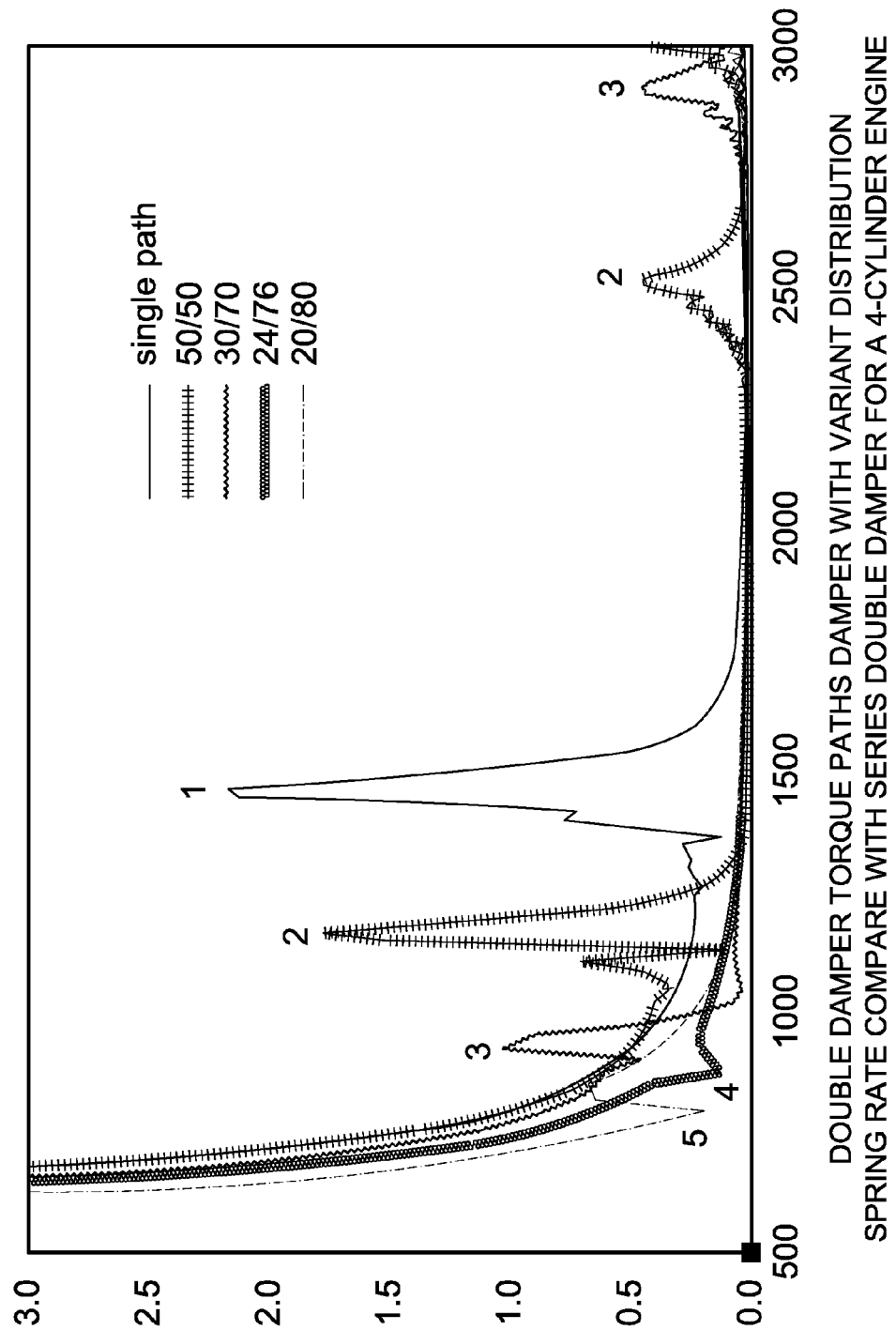
FIG. 7 is a graph of the damper effects of the double path damper at different spring rate ratios.

The simulation results for two conventional dampers are shown in FIG. 8. Series Double Damper 20 has a damper mode at about 1500 rpm and Series Turbine Damper 10 has an inner flange mode at about 2500 rpm. In V8 mode the turbine mode in SDD 20 is about 750 rpm and inner flange mode in STD 10 is about 1250 rpm. Therefore both prior art series dampers have a resonance made at about 1200~1500 rpm either in V8 or V4 mode which is well within the normal driving conditions for several types of vehicles. Due to design limitations, these resonance frequencies cannot be shifted to a less critical region. However if the vibration path is divided along two parallel paths and split the floating flange inertia to half (0.0135/2) and attach the turbine mass to one of the flanges as in the DPD 30 (FIG. 3), two separate natural frequencies are formed. Since it is preferred to keep the damper characteristic the same as the original design, the spring rate is distributed in two different paths. Different trials were used to determine an optimum spring ratio. A 50/50 spring rate ratio distribution means the spring ratio is 50% for path B and 50% for path C (FIG. 7 line 2). Note that the damper characteristic would not change. If the spring ratio is changed to 30% for path B (with turbine mass) and 70% for path C, we see the results in line 3 of FIG. 7. By running simulations for different spring ratios, it was found that an optimum spring ratio can be determined for each design. In the present example, the ratio of 24% for path B and 76% for path C has the best result as seen in FIG. 7 line 4. If the spring ratio is decreased further to 20% for path B and 80% for path C, the drivetrain mode (vibration) returns at about 800 rpm (FIG. 7 line 5). Therefore, by adjusting the spring rate of the two vibration paths of DPD 30, vibrations normally present during normal driving modes can be reduced or eliminated from the vehicle drive train.

In some embodiments, the inertia of the flange 36 may be close to zero when the natural frequency of flange 38 approaches infinity. If needed, a small amount of friction 42 can be added internally between flange 36 and flange 38 in order to damp the natural frequency of the flange 38. Since the flange has a small inertia and a high frequency, it would need a small amount of friction 42 to eliminate the resonance. In addition, since the added friction is just between internal flanges it does not diminish the quality of the flange in the other frequency.

Thus it is seen that the objects of the invention are efficiently obtained, although changes and modifications to the invention should be readily apparent to those having ordinary skill in the art, which changes would not depart from the spirit and scope of the invention as claimed.

We claim:

1. A damper for a vehicle drivetrain having a clutch comprising:
   a first cover;
   a second cover;
   a first vibration pathway having a natural frequency, said first vibration pathway including a first inertial element disposed between a first pair of elastic elements, wherein one of said first pair of elastic elements is operatively connected to said first cover and the second of said first pair of said elastic elements is operatively connected to said second cover; and,
   a second vibration pathway having a natural frequency, said second vibration pathway including a second inertial element disposed between a second pair of elastic elements, wherein one of said second pair of elastic elements is operatively connected to said first cover and the second of said second pair of said elastic elements is operatively connected to said second cover;
   wherein said second vibration pathway is substantially parallel to said first vibration pathway; and,
   wherein the natural frequency of said first vibration pathway is lower than said natural frequency of said second vibration pathway.

2. The damper for a vehicle drivetrain as recited in claim 1 wherein the combined spring rate of said first pair of elastic elements is lower than the combined spring rate of said second pair of elastic elements.

3. The damper for a vehicle drivetrain as recited in claim 1 wherein the mass of said first inertia element is greater than the mass of said second inertia element.

4. The damper for a vehicle drivetrain as recited in claim 3 wherein the mass of said first inertia element includes a turbine, said turbine fixedly attached to said first inertia element.

5. The damper for a vehicle drivetrain as recited in claim 1 wherein the mass of said first inertia element is greater than the mass of said second inertia element and the combined spring rate of said first pair of elastic elements is lower than the combined spring rate of said second pair of elastic elements.

6. The damper for a vehicle drivetrain as recited in claim 1 further comprising a friction connection between said first inertia element and said second inertia element.

7. The damper for a vehicle drivetrain as recited in claim 1 wherein said first cover is operatively connected to an engine crankshaft of said vehicle drivetrain.

8. The damper for a vehicle drivetrain as recited in claim 1 wherein said second cover is operatively connected to a transmission input shaft of said vehicle drivetrain.

9. The damper for a vehicle drivetrain as recited in claim 1 wherein at least one of said first and second pair of elastic elements comprises compression springs.

10. The damper for a vehicle drivetrain as recited in claim 1 wherein at least one of said first and second pair of elastic elements comprises rubber slugs.

11. The damper for a vehicle drivetrain as recited in claim 1 wherein at least one of said first and second pair of elastic elements comprises a ball ramp with diaphragm spring.

12. The damper for a vehicle drivetrain as recited in claim 1 wherein at least one of the inertial elements is a floating flange.

13. The damper for a vehicle drivetrain as recited in claim 1 wherein said first cover is an outer hub and said second cover is an inner hub.

14. A damper for a torque converter having a clutch comprising:
    an outer hub;
    an inner hub;
    a first vibration pathway having a natural frequency, said first vibration pathway including a first inertial element disposed between a first pair of elastic elements, wherein one of said first pair of elastic elements is operatively connected to said outer hub and the second of said first pair of said elastic elements is operatively connected to said inner hub; and,
    a second vibration pathway having a natural frequency, said second vibration pathway including a second inertial element disposed between a second pair of elastic elements, wherein one of said second pair of elastic elements is operatively connected to said outer hub and the second of said second pair of said elastic elements is operatively connected to said inner hub;
    wherein said second vibration pathway is substantially parallel to said first vibration pathway; and,
    wherein the natural frequency of said first vibration pathway is lower than said natural frequency of said second vibration pathway.

15. The damper for a torque converter as recited in claim 14 wherein the combined spring rate of said first pair of elastic elements is lower than the combined spring rate of said second pair of elastic elements.

16. The damper for a torque converter as recited in claim 14 wherein the mass of said first inertia element is greater than the mass of said second inertia element.

17. The damper for a torque converter as recited in claim 16 wherein a turbine is fixedly attached to said first inertia element.

18. The damper for a torque converter as recited in claim 14 wherein the mass of said first inertia element is greater than the mass of said second inertia element and the combined spring rate of said first pair of elastic elements is lower than the combined spring rate of said second pair of elastic elements.

19. The damper for a torque converter as recited in claim 18 wherein a turbine is fixedly attached to said first inertia element.

20. The damper for a torque converter as recited in claim 14 further comprising a friction connection between said first inertia element and said second inertia element.

21. The damper for a torque converter as recited in claim 14 wherein said outer hub is operatively connected to an engine crankshaft of said vehicle drivetrain.

22. The damper for a torque converter as recited in claim 14 wherein said inner hub is operatively connected to a transmission input shaft of said vehicle drivetrain.

23. The damper for a torque converter as recited in claim 14 wherein at least one of said first and second pair of elastic elements comprises compression springs.

24. The damper for a torque converter as recited in claim 14 wherein at least one of said first and second pair of elastic elements comprises rubber slugs.

25. The damper for a torque converter as recited in claim 14 wherein at least one of said first and second pair of elastic elements comprises a ball ramp with diaphragm spring.

26. The damper for a torque converter as recited in claim 14 wherein a turbine is fixedly attached to said first inertia element.

27. The damper for a torque converter as recited in claim 14 wherein at least one inertial element is a flange.

* * * * *